United States Patent

Scott

[15] 3,659,030
[45] Apr. 25, 1972

[54] AUDIO-VISUAL TOY
[72] Inventor: Donald W. Scott, East Aurora, N.Y.
[73] Assignee: The Quaker Oats Company
[22] Filed: Jan. 15, 1970
[21] Appl. No.: 3,008

[52] U.S. Cl................................................35/8 A, 274/1 A
[51] Int. Cl. .........................................................G09b 5/06
[58] Field of Search....................274/9, 15, 1 A; 35/8 A, 9 R, 35/35 C; 40/28.1, 340; 353/15, 19, 120

[56] References Cited

UNITED STATES PATENTS

| | | |
|---|---|---|
| 3,397,467 | 8/1968 | Genin et al................................35/35 C |
| 2,936,342 | 5/1960 | Kallmann..............................35/35 C X |
| 3,491,462 | 1/1970 | Ward.....................................35/35 C |

*Primary Examiner*—Wm. H. Grieb
*Attorney*—Cumpston, Shaw & Stephens

[57] ABSTRACT

An audio-visual toy uses a record element bearing recordings and visual displays, and the toy includes a movable transducer for reproducing sound from the recordings while the visual displays stand still. A selector mechanism is movable relative to the displays, and its position determines the recording tracked by the transducer. Such an arrangement is embodied in a question-and-answer toy.

61 Claims, 17 Drawing Figures

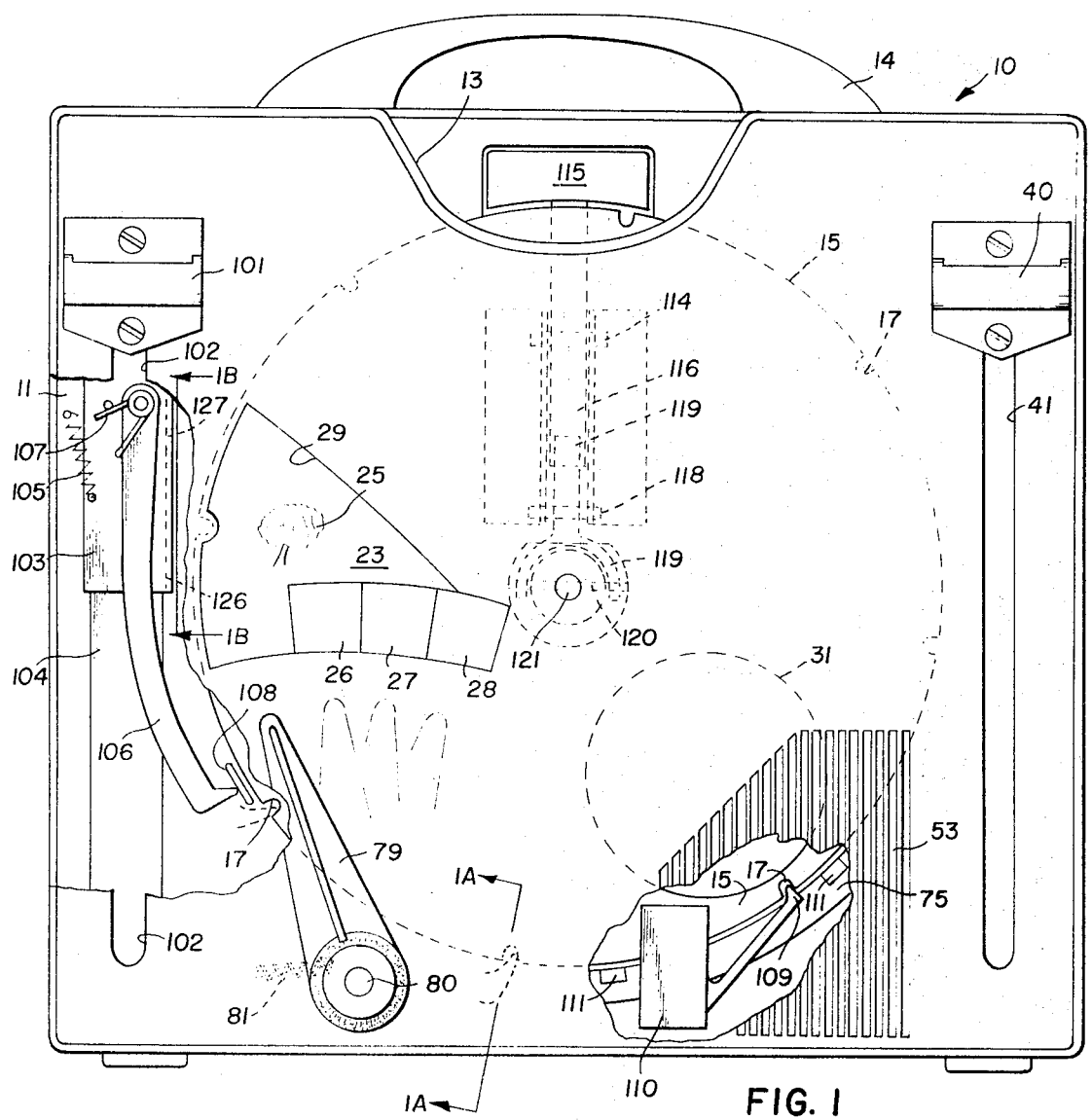
FIG. 1
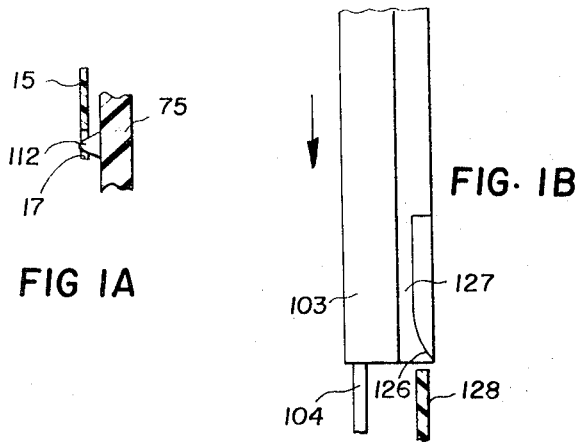
FIG 1A
FIG. 1B
INVENTOR.
DONALD W. SCOTT
BY Cumpston, Shaw
and Stephens
ATTORNEYS

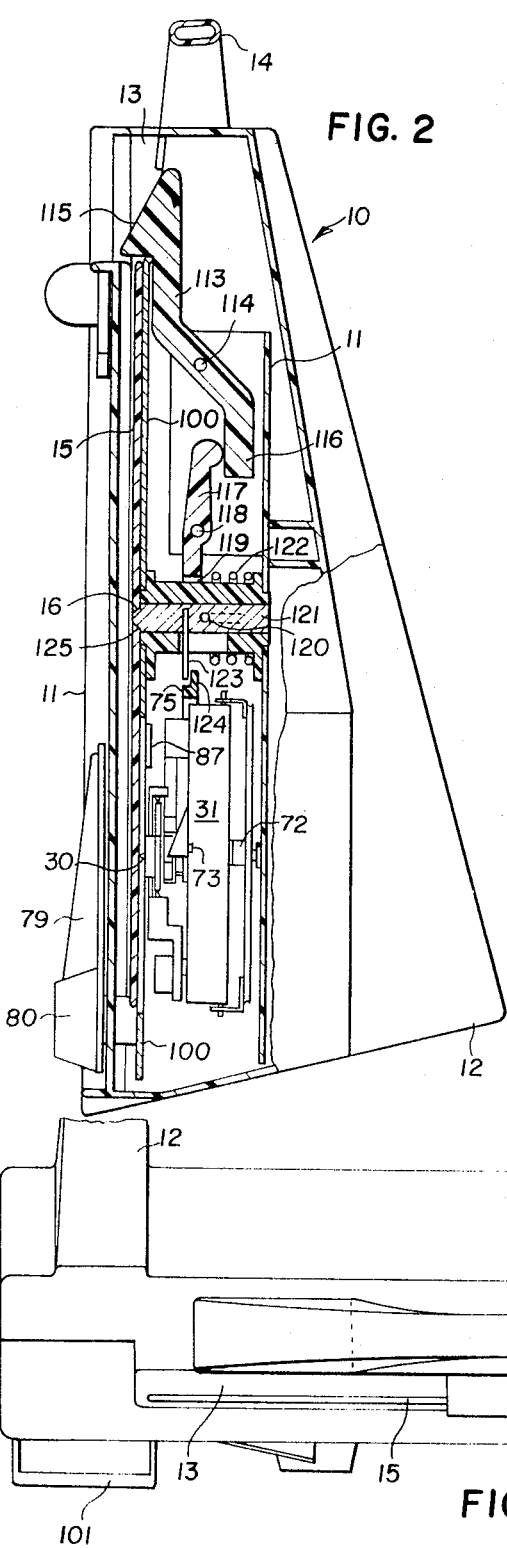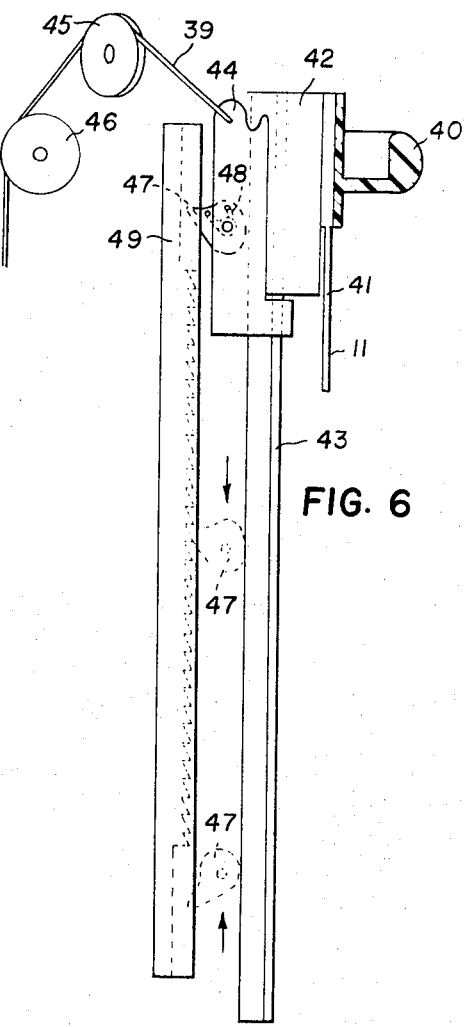

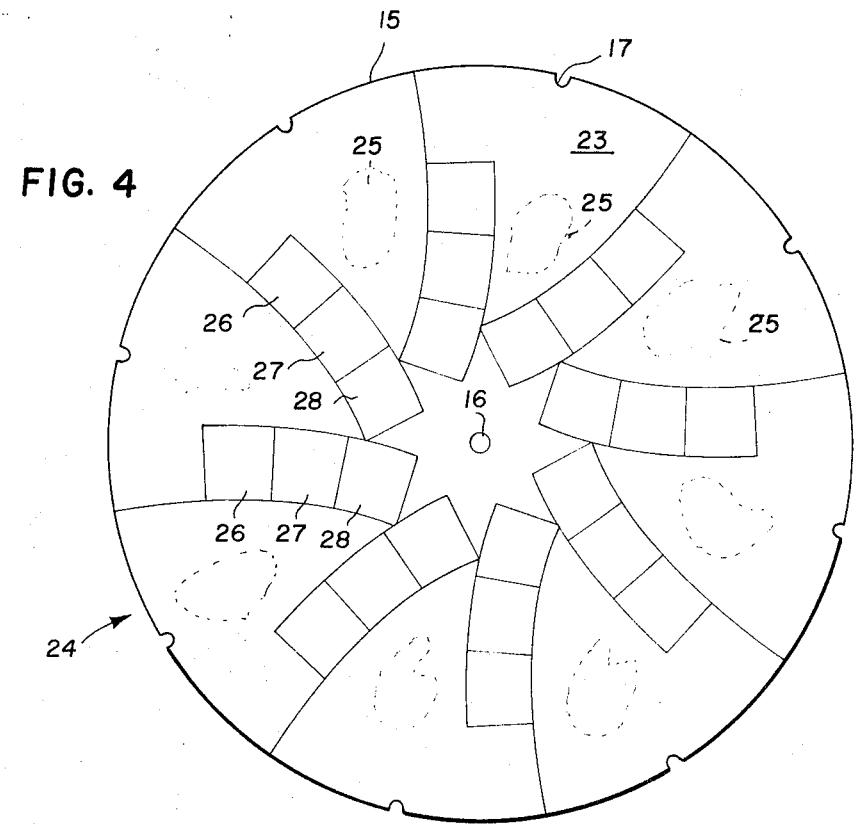
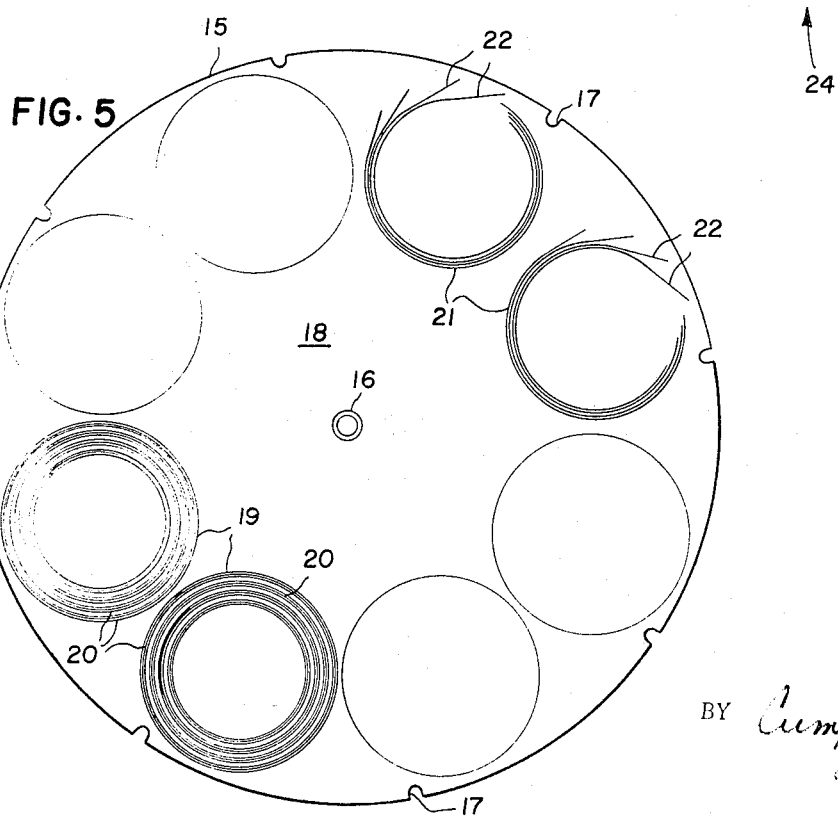

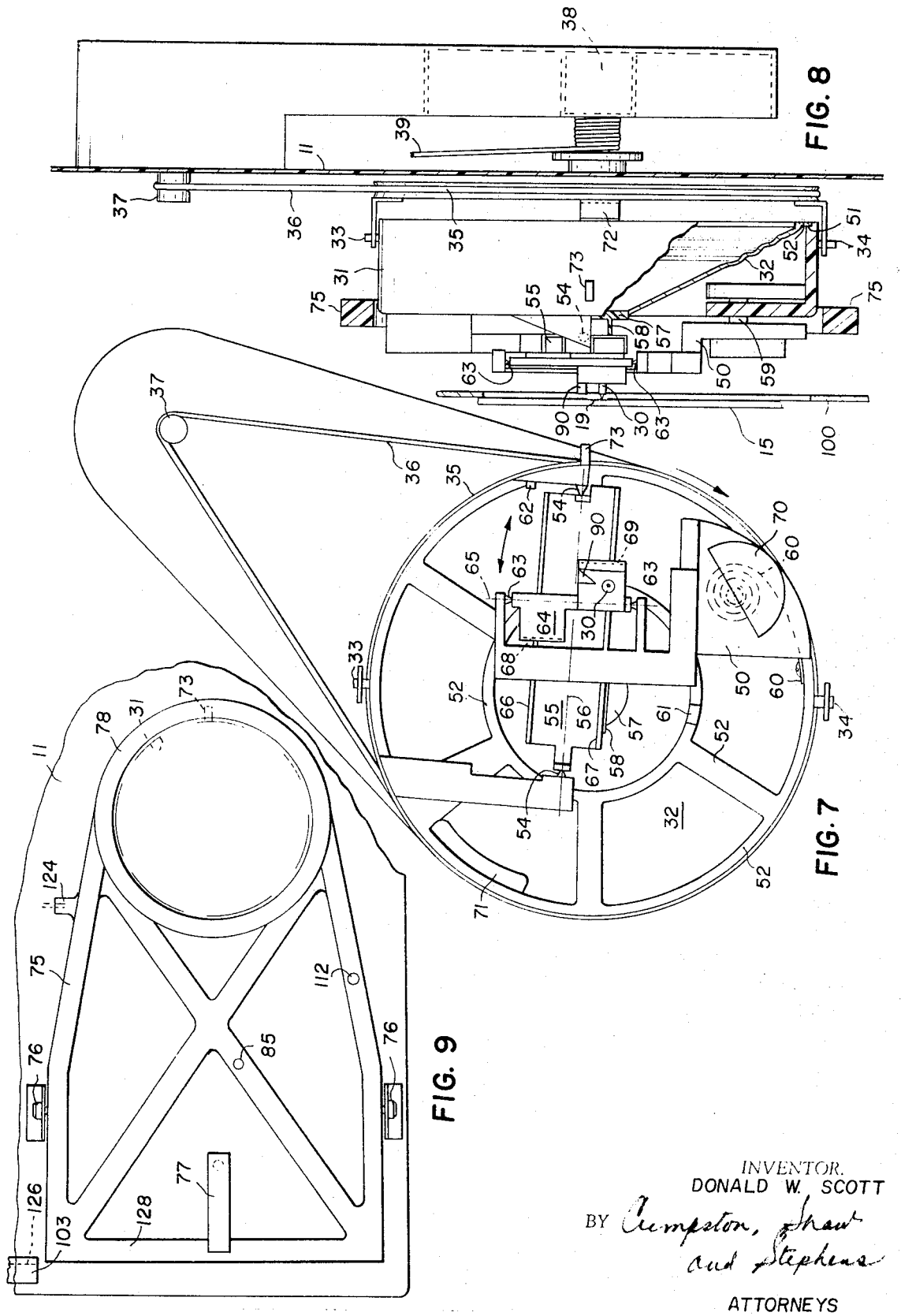

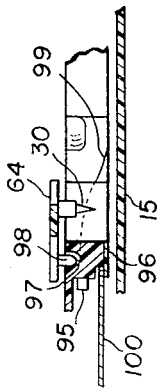
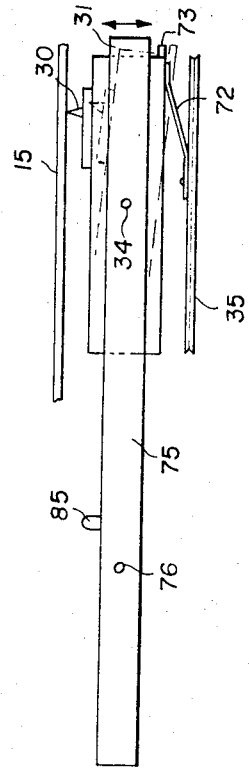
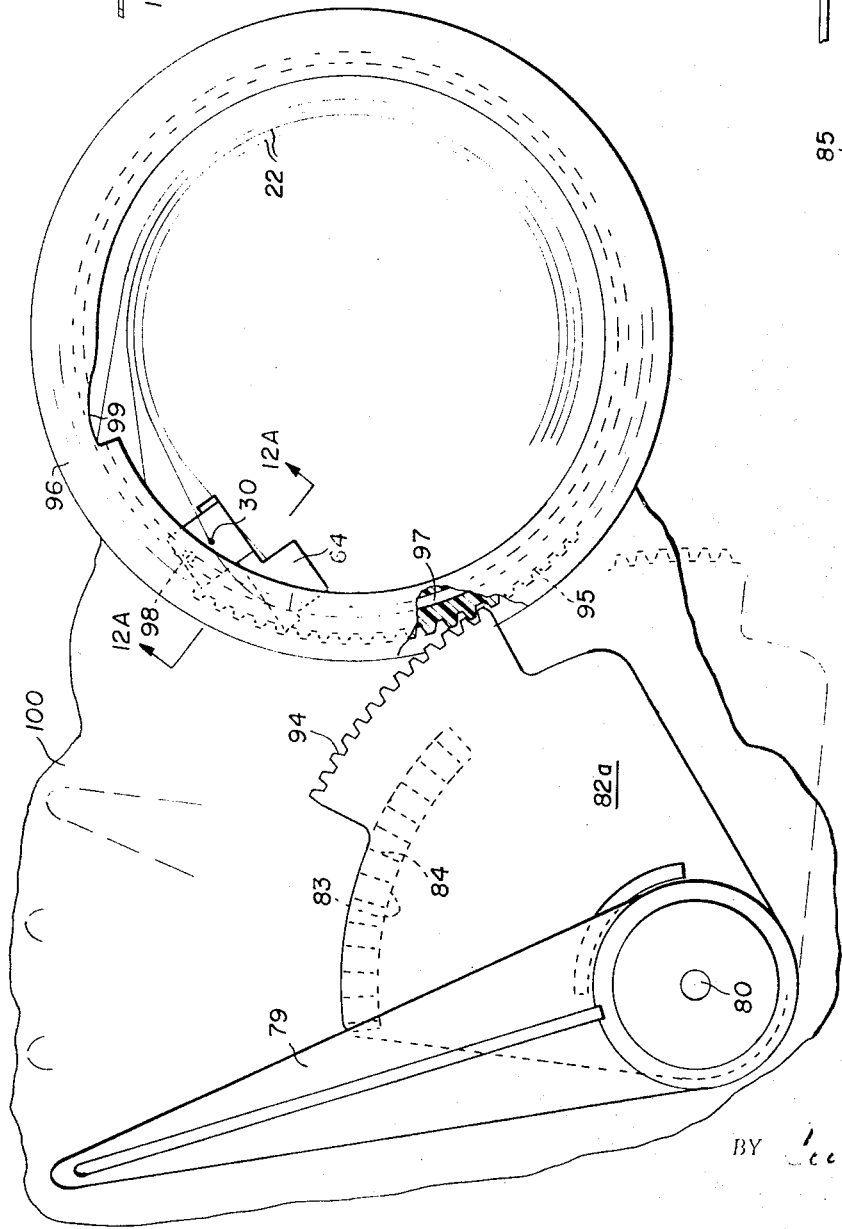

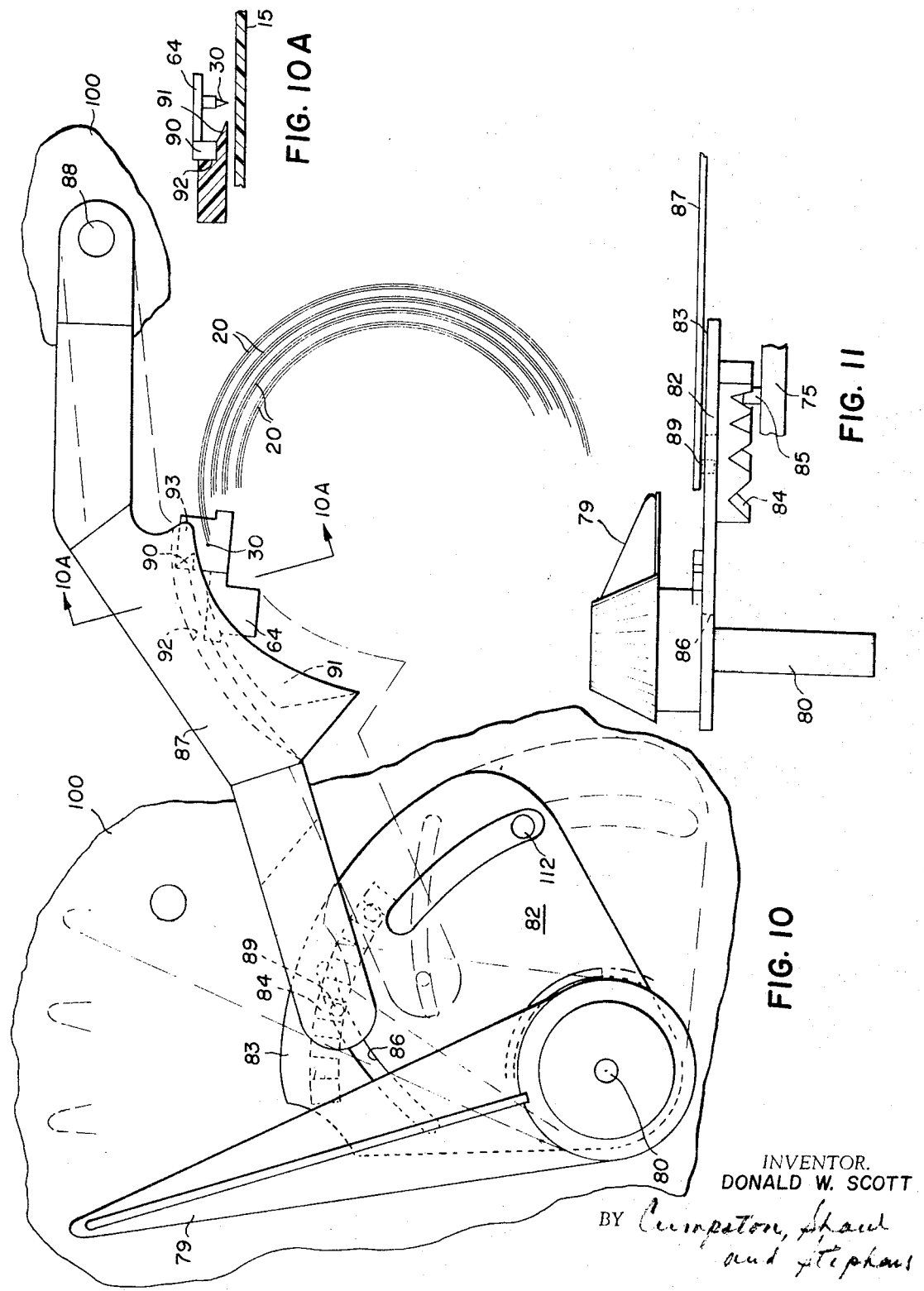

AUDIO-VISUAL TOY

THE INVENTIVE IMPROVEMENT

Toys that reproduce recorded sound are increasingly popular, but price limitations have made them crude, flimsy, short-lived, and unreliable. The invention seeks a more versatile audio-visual toy that uses many visual displays and mechanically correlated sound recordings for a great variety of play possibilities. The displays stand still while the recordings are played, and the recordings are always correctly correlated to displays. The child participates creatively in manipulating the toy, selecting multiple choices, and enjoying reinforcement of correct answers and mild correction for wrong ones. The invention also aims at an economical, rugged, reliable, and attractive toy that is visually and audibly appealing and able to withstand abuse and hard use.

SUMMARY OF THE INVENTION

The invention audio-visual toy includes a support for holding a record element having visual displays and correlated recordings; a movable transducer is driven for tracking the recordings to reproduce sound from the recordings; and a selector mechanism is movably mounted on the support for choosing between the visual displays and determining which of the recordings the transducer will track. Many specific features and refinements of such toy are also covered by the invention.

DRAWINGS

FIG. 1 is a partially cut-away front elevational view of a preferred embodiment of the inventive toy;

FIGS. 1a and 1b are fragmentary cross-sectional views taken along the identified lines of FIG. 1;

FIG. 2 is a partially cut-away side elevational view of the toy of FIG. 1;

FIG. 3 is a top view of the toy of FIG. 1;

FIG. 4 is a front elevational view of a preferred record element of the toy of FIG. 1;

FIG. 5 is a rear elevational view of the record element of FIG. 4;

FIG. 6 is a fragmentary, side-elevational view of the winding mechanism for the toy of FIG. 1;

FIG. 7 is a fragmentary, elevational view of a sound transducer and drive mechanism for the inventive toy;

FIG. 8 is a side elevational view of the sound mechanism of FIG. 7;

FIG. 9 is a yoke mechanism for use in the inventive toy;

FIG. 9a is a fragmentary, side-elevational view of the yoke mechanism of FIG. 9;

FIG. 10 is a fragmentary, elevational view of a selector mechanism for the inventive toy;

FIG. 10a is a fragmentary, cross-sectional view taken as indicated in FIG. 10;

FIG. 11 is a fragmentary, side-elevational view of the mechanism of FIG. 10;

FIG. 12 is a fragmentary, elevational view of an alternative selector mechanism for the inventive toy; and FIG. 12a is a fragmentary, cross-sectional view taken as indicated in FIG. 12.

DETAILED DESCRIPTION

The drawings show one preferred embodiment of the invention designed as a question-and-answer toy, but it should be understood that many other toys are possible within the spirit of the invention.

Before considering the details of the illustrated toy, it would be helpful to have a general understanding of its operation. It is a question-and-answer toy using record elements having sound recordings and visual displays arranged so that the record element can be held in the toy and sounds reproduced from its recordings while its visual displays are visible to a child operator. A selector mechanism is movable by the child for selecting one of several visual displays and the correlated sound recording to be played. The child indexes the record element and energizes the sound system by moving handles on the front of the toy. In general, the first sounding asks a question, the child selects a visual answer, and a second sounding reports on the appropriateness of the answer.

Toy 10 includes a support 11 formed as a housing or casing for the working elements of the toy. Support 11 has rear projections 12 enabling it to stand freely for operation, and projections 12 are preferably spaced to straddle a child's legs so that the toy can rest on a child's lap. The moving parts in toy 10 are preferably dynamically balanced for smooth operation at any orientation.

Support 11 includes a carrying handle 14 and is formed with a slot 13 for receiving a record element 15. Slot 13 opens at the top of support 11 near carrying handle 14 so that record element 15 can be inserted and withdrawn. Record element 15 is a generally plane, circular disk having a central hole 16 and notches 17 around its perimeter.

The rear face 18 of record element 15 has recordings preferably formed as mechanically modulated grooves arranged in spiral patterns. Two alternatives for such recordings are shown in FIG. 5. Recordings 19 have four, radially separated spiral grooves 20 arranged generally concentrically, and recordings 21 have four angularly separated spiral grooves 22 winding inward together in generally concentric paths.

The front face 23 of record element 14 has visual displays as illustrated in FIG. 4. Record element 15 has eight index positions with eight notches 17, eight groups of recordings 19 or 21, and eight visual display groups 24. Each of the display groups 24 is visible in succession through opening 29 in the front face of support 11 as record element 15 is indexed through its eight operating positions. Each of the display groups 24 includes a reference display 25 and related displays 26–28. The reference displays 25 illustrate a visual question or problem, and the related displays 26–28 illustrate visual answers or solutions. Record grooves 20 or 22 are each correlated with one of the displays 25–28 to provide an appropriate sound message matching each display. Many question and answer games, quizzes, and informational presentations can be used with such an arrangement.

SOUND SYSTEM

Recordings 19 or 21 are preferably mechanically modulated as generally known in the art, and a stylus 30 is vibrated by tracking the modulations to reproduce the recorded sounds. Stylus 30 is movably mounted on rotatable head 31 as described more fully below. Head 31 also carries speaker 32 that is driven by the vibrations from stylus 30. Head 31 is carried on pivots 33 and 34 extending from rotatably driven element 35. The periphery of element 35 is formed as a pulley wheel and carries a belt 36 extending around pulley 37 of a governor or speed regulator to control the speed of rotation of element 35 and head 31.

Rotational power for head 31 is supplied by spring motor drive 38 which is arranged coaxially with driven element 35. Energy is supplied to spring motor drive 38 by a pull string 39 that is tensioned and moved by the child operator. Handle 40 on the outside of support 11 is arranged for moving vertically downward in a slot 41, and a traveler 42 arranged inside the front face of support 11 is secured to handle 40 and arranged for moving vertically on guide 43.

As best shown in FIG. 6, pull string 39 extends over pulleys 45 and 46 and is fastened to a carriage 44 disposed below traveler 42 and arranged for moving vertically on guide rail 43. Carriage 44 also carries a movable cog 47 biased by a spring 48 to ride against the teeth of a ratchet 49 arranged below and parallel with guide rail 43. As handle 40 is pulled downward in slot 41, traveler 42 forces carriage 44 downward to move pull string 39 for winding spring motor drive 38.

Cog 47 rides downward over the teeth of ratchet 49, and if the downward motion of handle 40 is stopped before reaching the bottom of slot 41, cog 47 engages the teeth of ratchet 49 under the bias of spring 48 and prevents any upward movement of carriage 44. This prevents partial winding of spring motor drive 38, and partial play of a sound message from the record grooves. Near the bottom of the motion of handle 40, the teeth of ratchet 49 terminate to allow room for pivoting of cog 47 counterclockwise as illustrated in FIG. 6 so that carriage 44 is free to move upward on guide rail 43 as spring motor drive 38 turns to rotate head 31 and rewind pull string 39. Near the top of the travel of handle 40 and carriage 44, the teeth of ratchet 49 are also cut away to allow cog 47 to be cammed clockwise as illustrated in FIG. 6 by engagement with the teeth of ratchet 49 for riding freely downward.

Head 31 is preferably formed of plastic material in the generally cylindrical shape illustrated to support speaker 32 on a ledge 51 around the inside periphery of head 31. A framework 52 extends across head 31 at the back of speaker 32 with openings for transmission of the back radiation from speaker 32. A grille-like opening 53 is formed in the front of support 11 for allowing sound from speaker 32 to pass outward from toy 10. Head 31 carries gudgeons or pivots 54 pivotally supporting speaker rocker arm 55 for rocking motion about its pivot axis 56 extending between pivots 54. A plug 57 joined to speaker 32 in its central region is fastened to one side of speaker rocker arm 55 by a flexible tab 58 extending from plug 57. Tab 58 connects to speaker rocker arm 55 off the pivot axis 56 so that rocking motion of speaker rocker arm 55 drives tab 58 in and out to vibrate speaker 32. Tab 58 and plug 57 are preferably formed of plastic and can have a variety of shapes. Also, tab 58 can be secured to rocker arm 55 in a variety of ways or can be formed integrally with rocker arm 55 and secured to plug 57. Tab 58 or other connector between speaker 32 and speaker rocker arm 55 is substantially rigid in the driving direction of speaker 32 but sufficiently flexible transverse to this direction so that it can bend slightly as rocker arm 55 moves.

Head 31 also carries tone arm 50 having a pivot 59 allowing motion back and forth as indicated by the double-headed arrow. A spring 60 secured to pivot 59 and head 31 biases tone arm 50 radially outward relative to head 31 so that stylus 30 starts in an outer turn of spirals 20 or 22 and tracks inward. Stylus 30 could also track outward, and for this, spring 60 would bias tone arm 50 inward relative to head 31. Pivotal motion of tone arm 50 is limited by an inward stop 61 and an outward stop 62.

Gudgeons or pivots 63 on tone arm 50 support stylus rocker arm 64 for pivotal rocking motion about its pivot axis 65 extending between pivots 63. Vibrations of stylus 30 in response to the modulations in recordings 19 or 21 produce rocking motion in stylus rocker arm 64. Preferably the modulations in spirals 20 and 22 are lateral or transverse, and stylus 30 is mounted near pivot axis 65. A similar arrangement can be used for vertical groove modulations of spirals 20 or 22 with stylus 30 mounted well off pivot axis 65.

Bearing ridges 66 and 67 are formed on the edges of speaker rocker arm 55 on opposite sides of pivot axis 56, and face or extend toward stylus rocker arm 64. Stylus rocker arm 64 has bearing surfaces 68 and 69 on opposite sides of pivot axis 65 respectively engaging ridges 66 and 67 of speaker rocker arm 55. As stylus 30 bears against spirals 20 or 22, stylus rocker arm 64 maintains contact with speaker rocker arm 55, and the pivot arc of tone arm 50 is such that this contact is continuous all the way between stops 61 and 62.

In operation, if a groove modulation moves stylus 30 to depress surface 69 and elevate surface 68 relative to speaker rocker arm 55, then ridge 67 is depressed, and ridge 66 is elevated to move tab 58 for advancing speaker 32 to direct a compression phase forward from toy 10. A modulation in the other direction moves stylus 30 to depress surface 68 and elevate surface 69 relative to speaker rocker arm 55. This depresses ridge 66 and elevates ridge 67 to move tab 58 for retracting speaker 32 to form a rarefaction phase. The modulations of the record grooves are thus transmitted through stylus 30, stylus rocker arm 64, speaker rocker arm 55, tab 58, and plug 57, to speaker 32 for producing the sound recorded in the modulations of recordings 19 or 21.

Since spring 60 biases tone arm 50 outward, an inward tracking force is exerted on stylus 30 by the outer edge of spirals 20 or 22 as stylus 30 tracks inward. This inward tracking force tends to rotate stylus rocker arm 64 to depress surface 68 and elevate surface 33. To compensate for this, stylus 30 is offset from pivot axis 65 radially outward so that its force against the record grooves normal to the plane of record element 15 tends toward an opposite rotation of arm 64. This keeps stylus rocker arm 64 in relative equilibrium between stylus pressure forces and tracking forces and improves the fidelity of the sound.

The frictional drag on stylus 30 tends to rotate stylus rocker arm longitudinally to press upward on after pivot 63 and downward on forward pivot 63. This tends to elevate surface 68 and depress surface 69. To compensate, stylus 30 is preferably mounted forward of speaker rocker arm pivot axis 56 in the direction of travel of stylus 30 in the record grooves. The rotational tendency from stylus force normal to record element 15 then balances the torque from the frictional drag.

Preferably tone arm 50 is balanced by weight 70 arranged on the opposite side of journal 59 from stylus rocker arm 64, and balance weight 71 is preferably added to head 31 opposite tone arm 50 so that the entire assembly is rotationally balanced. Toy 10 can then be operated in any orientation with equal and balanced results.

SELECTION SYSTEM

Head 31 is pivotally supported on pivots 33 and 34 for rotation in the direction of the arrow, and a spring 72 secured to driven element 35 is arranged to bias head 31 in a pivotal direction such as to bring stylus 30 into engagement with record element 15. Tone arm 50 and stylus 30 are generally arranged off the axis of head 31 toward one side of head 31, and a lug 73 extends outward from head 31 in approximately the same radial region of head 31 as occupied by stylus 30.

A yoke 75 is pivotally mounted on pivots 76 on support 11 and biased by spring 77 toward a normally assumed position as shown in FIGS. 9 and 9a where it does not engage head 31. Yoke 75 includes a ring 78 encircling head 31 and arranged to engage lug 73 on the side of head 31 if yoke 75 is actuated by movement from its normally assumed position. Such engagement of ring 78 with lug 73 moves head 31 against the bias of spring 72 to retract stylus 30 from record element 15 as shown in broken lines in FIG. 9a. Such retraction of stylus 30 allows tone arm 50 to swing radially outward under the bias of its spring 60 for starting at the radially outermost portions of spirals 20 and 22.

A selector mechanism is arranged for selecting the spirals 20 or 22 to be tracked by stylus 30 as head 31 is rotated. The selector mechanism includes a selector lever or pointer 79 arranged on the front face of support 11 and pointing toward opening 29 in which display groups 24 are visible. A hub 80 carrying pointer 79 extends through the front wall of support 11 to the interior of the toy for operating devices to control the tracking of grooves by stylus 30. A spring 81 biases hub 80 counterclockwise as viewed in FIG. 1 so that pointer 79 normally moves to the left to point toward reference display 25. A sector 82 or 82a extends radially outward from hub 80 inside support 11 for positioning groove selection devices. FIGS. 10–12 show tow modes of selector operation for guiding stylus 30 into spirals 20 and 22 respectively. These will be described more fully below.

Sectors 82 and 82a each have an arcuate region 83 formed with notches 84 facing toward yoke 75, and yoke 75 has a follower 85 facing toward notches 84. As selector pointer 79 is moved between choice positions, notches 84 depress follower 85 and actuate yoke 75 to retract stylus 30. Yoke 75 is held out of its normally assumed position except when selector pointer 79 is centered on a choice position with follower 85 detented in one of the notches 84. This not only detents the selector mechanism in choice positions, but retracts stylus 30 as the selector mechanism is moved between choice position. Also, actuation of yoke 75 for any other reason removes follower 85 from notches 84 and lets pointer 79 move counterclockwise under the bias of spring 81 to the position illustrated in FIG. 1. Furthermore, actuation of yoke 75 to retract stylus 30 allows tone arm 50 to swing radially outward so that stylus 30 always starts from its radially outermost position after any actuation of yoke 75.

As best shown in FIG. 10, sector 82 of the selector mechanism has a cam slot 86 for positioning a cam 87 pivotally mounted on pivot 88 on plate 100 in support 11 to move generally radially relative to head 31. Cam 87 has a follower projection 89 riding in slot 86, and angular movement of sector 82 between detented choice positions moves cam 87 radially inward and outward between its broken-line and solid-line positions. Such an arrangement is used for selecting the one of the spirals 20 to be tracked by stylus 30 where spirals 20 are radially separated as illustrated.

A stylus follower projection 90 extends outward from stylus rocker arm 64 in the region of stylus 30 and is engaged by a shaped surface 91 of cam 87. Stylus 30 starts in a radially outward position, as previously explained, and cam 87 is positioned as controlled by sector 82 and pointer 79. During the first revolution of head 31, stylus follower 90 is picked up by surface 91 of cam 87 to hold stylus 30 away from record element 15. As stylus follower 90 moves over shaped surface 91, it engages the radially outward edge 92 of cam 87 and is carried to a release region 93 where it drops off the end of surface 91. The radial position of release region 93 thus determines which one of the spirals 20 stylus 30 will engage, and since release region 93 is radially movable over spirals 20, the positioning of pointer 79 can effectively select one of the four spirals 20 to be tracked by stylus 30. During subsequent revolutions of head 31, stylus 30 remains in the spiral groove it dropped into, and stylus 30 and follower 90 just clear cam 7 87.

In normal practice, pointer 79 is initially positioned at the left towards reference display 25 as illustrated in FIG. 1 with cam 87 in its solid-line position as shown in FIG. 10 so that the first sound reproduction is from the radially outermost spiral 20 asking a question or conveying a message as to reference display 25. Then pointer 79 is moved to point to one of the related displays 26–28, and the sound system is reactivated to rotate head 31. The position of pointer 79 determines the position of cam 87 and release region 93 so that during the first revolution of head 31 stylus follower 90 is picked up to remove stylus 30 from record element 15, and stylus follower 90 is guided to release region 93 and dropped to allow stylus 30 to engage the selected one of the spirals 20. This reproduces a sound message as to the relationship between the selected display and the reference display.

As best shown in FIGS. 12 and 12a, sector 82a is similar to sector 82 generally and operates through a similar arcuate scope. Sector 82a has teeth 94 meshing with teeth 95 of a rotatable cam 96 carried over a circular opening in plate 100 concentrically with and closely adjacent head 31. Cam 96 has a groove 97 around its periphery, and a stylus follower 98 projects outward from stylus rocker arm 64 in the region of stylus 30 for riding in groove 97, A portion of cam 96 is cut away to form an opening 99 leading from groove 97 providing a release region letting stylus follower 98 drop from groove 97 so that stylus 30 can engage record element 15. Such an arrangement is preferred for selecting the one of the angularly separated spirals 22 to be tracked by stylus 30.

In operation, when yoke 75 is actuated to depress head 31 and retract stylus 30 from record element 15, tone arm 50 swings radially outward so that stylus follower 98 moves to the region of groove 97 of cam 96. Then when yoke 75 returns to its normally assumed position, stylus follower 98 drops into groove 97 to hold stylus 30 away from record element 15. As the sound system is actuated to rotate head 31, stylus follower 98 rides in groove 97 for a part of the first revolution until follower 98 falls into release region opening 99 to let stylus 30 contact record element 15. Since release region 99 is angularly movable under control of sector 82a, the position of pointer 79 and sector 82a controls the one of the angularly separated spirals 22 that stylus 30 will first contact and thereafter track.

RECORD-INDEXING

Record element 15 has eight display groups 24 and correlated recordings 19 or 21 and is preferably indexed through eight positions for displaying each of the groups 24 and for reproducing sound from each of the recordings 19 or 21. Notches 17 are used for such indexing.

A handle 101 arranged on the front face of support 11 for movement vertically in slot 102 controls the indexing. Handle 101 is secured to a traveler 103 inside support 11 for moving vertically on a guide rail 104. A spring 105 fastened to traveler 103 and to support 11 biases traveler 103 upward so traveler 103 and handle 101 return to the top of slot 102 after each actuation.

An index pawl 106 is pivotally carried on traveler 103 and is biased by a spring 107 toward engagement with record element 15. At the uppermost position of handle 101 and traveler 103, pawl 106 engages rest surface 108 and is out of contact with record element 15. As handle 101 is pulled downward, pawl 106 moves downward and pivots counterclockwise under the bias of spring 107 to engage a notch 17 adjacent rest surface 108 as shown in broken lines in FIG. 1 for moving record element 15 counterclockwise one full index position.

At full advancement of pawl 106 and record element 15, holding pawl 109 resiliently snaps into a subsequent notch 17 to hold record element 15 against any reversal. The bottom perimeter of record element 15 is held against axial movement by guide tab 110, and location lugs 111 help fix the radial position of record element 15. After full downward travel of handle 101 and traveler 103, handle 101 is released to return upward under the bias of spring 105, and index pawl 106 withdraws vertically and clockwise to ride back up on to rest surface 108. In such position, index pawl 106 is ready for a subsequent indexing of record element 15.

Traveler 103 has a cam surface 126 leading into a slot 127 arranged for engaging and travelling along the edge 128 of yoke 75 to move yoke 75 from its normally assumed position to an actuated position as traveler 103 moves downward. Cam surface 126 engages edge 128 to actuate yoke 75, and slot 127 holds edge 128 to maintain yoke 75 in its actuated position until traveler 103 returns back up to the top of slot 102. Such actuation of yoke 75 ensures that stylus 30 is retracted from record element 15 during its indexing.

To ensure proper indexing of record element 15 to an operating position before running the sound system, a registration lug 112 (FIG. 1a) is carried on yoke 75 to extend toward record element 15 and is arranged to fit into one of the notches 17 whenever record element 15 is properly indexed. In any intermediate position between operating positions of record element 15, registration lug 112 does not fit into a notch 17 and is held aside to maintain yoke 72 in an actuated position and keep stylus 30 away from record element 15. This prevents operation of stylus 30 unless recordings 19 or 21 are accurately concentric with head 31. The actuation of yoke 75 by cam surface 126 of index traveler 103 retracts registration lug 112 from notch 17 to free record element 15 for index motion.

RECORD CHANGING

Record element 15 is preferably removable from toy 10 and interchangeable with other record elements by withdrawal and insertion of record element 15 through the top opening of slot 13. A slot-blocking member 113 having a blocking projection 115 at its upper end is mounted on pivot 114 for movably obstructing the top of slot 113. The lower end 116 of slot-blocking member 113 engages a lever 117 supported on pivot 118 and having a forked end 119 engaging radial projections 120 on axially movable hub 121. A spring 122 biases hub 121 toward engagement with central hole 16 in record element 15 and the bias of spring 122 tends to pivot lever 117 clockwise as illustrated in FIG. 2. To insert or withdraw a record element 15, slot-blocking projection 115 is moved aside to pivot lever 117, compress spring 122, and retract hub 121 for clearing the slot 13.

A projection 123 extending outward from hub 121 engages a lug 124 on yoke 75 so that retraction of hub 121 moves yoke 75 from its normally assumed position for an actuation that retracts stylus 30 from the path of recorded element 15. Actuation of yoke 75 also lets tone arm 50 swing outward and frees selector pointer 79 for rotating to its normally assumed position.

Hole 16 in record element 15 is preferably conical as illustrated to fit the corresponding conical shape 125 of the tip of hub 121. This requires the display face 23 of record element 15 to face outward for seating the conical tip 125 of hub 121 in hole 16. If record element 15 is placed in slot 13 backwards, then hub 121 does not seat in hole 16, and yoke 75 is held in an actuated position by projection 123 and lug 124. This prevents stylus 30 from engaging the front display face 23 of record element 15.

ALTERNATIVES

It can be seen from the above description of the illustrated toy that many separate functions and devices combine to accomplish the working of the toy. Many of these have substitutes or alternatives that can be adapted to the spirit of the invention. For example, the sound reproduction need not be mechanical, the recordings need not be mechanically modulated grooves, and electric sound systems or magnetic recording systems can be used within the spirit of the invention. Also, the features of the invention can be used in many other ways in different toys.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, different record index devices, different motor drive arrangements, different stylus and speaker mounting systems, and different ways of interchanging records can all be devised within the spirit of the invention.

I claim:
1. An audio visual toy comprising:
a. a support;
b. a record element held by said support;
c. a plurality of visual displays arranged on said record element to be visible to an operator;
d. a plurality of recordings on said record element;
e. each of said recordings being correlated to one of said visual displays;
f. a transducer for reproducing sound from from said recordings;
g. means for mounting said transducer for movement relative to said record element for tracking recordings while said visible displays stand still;
h. means for driving said transducer in said tracking motion;
i. a selector mechanism movably mounted on said support for selecting an operator's choice of said visual displays;
j. said selector mechanism being arranged so that the selection of one of said visual displays determines that said transducer will track the one of said recordings correlated with said selected visual display when said transducer is driven relative to said record element;
k. a yoke;
l. means for movably mounting said yoke on said support;
m. means for biasing said yoke toward a normally assumed position;
n. means for interengaging said yoke and said transducer mounting means upon said actuation for retracting said transducer from said record element; and
o. means for interengaging said selector mechanism and said yoke to cause said actuation of said yoke when said selector mechanism is moved from a choice position.

2. The toy of claim 1 wherein said record element is removable from said support and interchangeable with other record elements, and means are arranged on said support for causing said actuation of said yoke when said record element is moved to or from its operating position.

3. The toy of claim 2 wherein said record element is generally plane with said visual displays arranged on one face and said recordings arranged on the opposite face.

4. The toy of claim 1 wherein said record element is indexable through a sequence of positions each of which includes said visual displays and said recordings, an index device is arranged on said support for indexing said record element, and means for interengaging said index device and said yoke to cause said actuation of said yoke upon operation of said index device.

5. The toy of claim 4 wherein said record element is generally plane with said visual displays arranged on one face and said recordings arranged on the opposite face.

6. Toy of claim 4 wherein said record element is removable from said support and interchangeable with other record elements, and means are arranged on said support for causing said actuation of said yoke when said record element is moved to or from its operating position.

7. The toy of claim 6 wherein the periphery of said record element is formed with a notch for each of said index position, and registration means is arranged for causing said actuation of said yoke except when one of said notches is registered with said registration means.

8. The toy of clam 7 wherein the periphery of said record element is formed with a notch for each of said index positions, and registration means is arranged for causing said actuation of said yoke except when one of said notches is registered with said registration means.

9. The toy of claim 1 wherein said record element is generally plane with said visual displays arranged on one face and said recordings arranged on the opposite face.

10. The toy of claim 1 wherein said visual displays include a reference display and a plurality of related displays; a reference one of said recordings correlates with said reference display and contains information as to the desired relationship between said reference display and one of said related displays; and a related one of said recordings correlates with each of said related displays and contains information as to the relationship between said reference display and the respective 11. The toy of claim 10 wherein said record element is generally plane with said visual displays arranged on one face and said recordings arranged on the opposite face.

12. The toy of claim 11 wherein the periphery of said record element is formed with a plurality of index notches arranged for locating each of said correlated displays and recordings.

13. The toy of claim 1 wherein said transducer mounting means comprises: a rotatably driven element; a head carrying said transducer and pivotally mounted on said driven element; a bias spring between said driven element and said head for biasing said head on its pivot to urge said transducer toward said record element; and said actuation of said yoke being arranged to cause movement of said head against said bias.

14. The toy of claim 13 wherein said recordings comprise spiral grooves on said record element and said transducer includes a speaker and stylus arranged on said head.

15. The toy of claim 14 wherein said yoke includes a ring encircling said head, and a lug is arranged on the same side of said head as said stylus for engagement with said ring.

16. The toy of claim 15 wherein said selector mechanism is arranged to cause said actuation of said yoke when said selector mechanism is moved from a choice position.

17. The toy of claim 23 wherein said selector mechanism includes a notched region, and said yoke carries a follower for engaging said notched region for causing said actuation of said yoke when said notched region is moved during selection.

18. The toy of claim 15 wherein said record element is removable from said support and interchangeable with other record elements, and means are arranged on said support for causing said actuation of said yoke when said record element is moved to or from its operating position.

19. The toy of claim 18 wherein said record element is generally plane with said visual displays arranged on one face and said recordings arranged on the opposite face.

20. The toy of claim 19 wherein said support is formed with a slot for receiving said record element, a slot-blocking member is movably arranged in said slot to be moved aside whenever said record element is inserted or withdrawn, and movement of said slot-blocking member is arranged to cause said actuation of said yoke.

21. The toy of claim 20 wherein said selector mechanism includes a notched region, and said yoke carries a follower for engaging said notched region for causing said actuation of said yoke when said notched region is moved during selection.

22. The toy of claim 20 including a movable hub for engaging a central opening in said record element, said slot-blocking member being arranged for retracting said hub from said record element, and said hub being coupled to said yoke for causing said actuation of said yoke when said hub is retracted.

23. The toy of claim 22 including a spring for biasing said hub toward engagement with said record element, said slot-blocking member being pivotally mounted and arranged for moving said hub against said spring when said slot-blocking member is moved aside, and an extension from said hub being arranged to engage and actuate said yoke when said hub is retracted.

24. The toy of claim 15 wherein said record element is indexable through a sequence of positions each of which includes said visual displays and said recordings, an index device is arranged to cause said actuation of said yoke upon operation of said index device.

25. The toy of claim 24 wherein said yoke has a surface extending in the direction of travel of said index device, and said index includes a cam for engaging said yoke surface when said index device is moved for indexing said record element.

26. The toy of claim 24 wherein the periphery of said record element is formed with a notch for each of said index positions and registration means is arranged for causing said actuation of said yoke except when one of said notches is registered with said registration means.

27. The toy of claim 24 wherein the periphery of said record element is formed with a plurality of index notches arranged for locating each of said correlated displays and recordings.

28. The toy of claim 27 wherein said index device includes a movable pawl for engaging said notches in succession to advance said record element upon actuation of said index device.

29. The toy of claim 28 including a holding pawl for engaging one of said notches when said record element is in one of said index position.

30. The toy of claim 29 wherein said yoke has a surface extending in the direction of travel of said index device, and said index includes a cam for engaging said yoke surface when said index device in moved for indexing said record element.

31. The toy of claim 30 wherein said selector mechanism includes a notched region; and said yoke carries a follower for engaging said notched region for causing said actuation of said yoke when said notched region is moved during selection.

32. The toy of claim 24 wherein said selector mechanism includes a notched region, and said yoke carries a follower for engaging said notched region for causing said actuation of said yoke when said notched region is moved during selection.

33. The toy of claim 24 wherein said record element is removable from said support and interchangeable with other record elements, and means are arranged on said support for causing said actuation of said yoke when said record element is moved to of from its operating position.

34. The toy of claim 33 wherein said record element is generally plane with said visual displays arranged on one face and said recordings arranged on the opposite face.

35. The toy of claim 34 wherein said support is formed with a slot for receiving said record element; a slot-blocking member is movably arranged in said slot to be moved aside wherever said record element is inserted or withdrawn; and movement of said slot-blocking member is arranged to cause said actuation of said yoke.

36. The toy of claim 35 including a movable hub for engaging a central opening in said record element, said slot-blocking member being arranged for retracting said hub from said record element, and said hub being coupled to said yoke for causing said actuation of said yoke when said hub is retracted.

37. The toy of claim 36 including a spring for biasing said hub toward engagement with said record element, said slot-blocking member being pivotally mounted and arranged for moving said hub against said spring when said slot-blocking member is moved aside, and an extension from said hub being arranged to engage and actuate said yoke when said hub is retracted.

38. The toy of claim 1 wherein said transducer mounting means comprises a rotatably driven mechanism carrying said transducer and said driving means includes a speed-regulated, spring motor drive arranged for rotating said driven mechanism.

39. The toy of claim 38 wherein said spring motor is wound by a cord tensioned by a carriage movable within said support, and a handle external to said support engages said carriage for said winding movement.

40. The toy of claim 439 wherein a ratchet is arranged along the path of movement of said carriage, and a cog is pivotally arranged on said carriage to engage said ratchet to prevent movement of said carriage toward an unwinding direction from any partially wound position.

41. The toy of claim 40 wherein said cog is arranged for pivoting after full winding motion of said carriage to permit movement of said carriage is said unwinding direction.

42. The toy of claim 1 wherein said recordings comprise spiral grooves on said record element; said transducer comprises a speaker and rotatable stylus for tracking said grooves; said selector mechanism includes a movable cam; and a follower projection is mounted in the region of said stylus for engaging said cam to guide said stylus into a selected one of said grooves.

43. The toy of claim 42 wherein said grooves are arranged in radially separated spirals and said cam is movable radially relative to said grooves.

44. The toy of claim 43 wherein said cam includes a surface for holding said stylus away from said record element as said stylus moves and for guiding said stylus to a release region radially movable relative to said grooves.

45. The toy of claim 42 wherein said grooves are arranged in angularly separated spirals, and said cam is movable angularly relative to said grooves.

46. The toy of claim 45 wherein said cam includes a surface for holding said stylus away from said record element as said stylus moves and for guiding said stylus to a release region angularly movable relative to said grooves.

47. The you of claim 42 wherein said selector mechanism includes a manually movable pointer mounted in the region of said visible displays and coupled to said cam for positioning said cam.

48. The toy of claim 47 wherein said grooves are arranged in radially separated apirals, and said cam is movable radially relative to said grooves; and wherein said cam includes a surface for holding sand stylus away from said record element as said stylus moves and for holding said stylus to a release region radially movable relative to said grooves.

49. The toy of claim 47 wherein said grooves are arranged in angularly separated spirals, and said cam is movable angularly relative to said grooves; and wherein said cam includes a surface for holding said stylus away from said record element as said stylus moves and for guiding said stylus to a release region angularly movable relative to said grooves.

50. The toy of claim 47 including a rotatable head supporting said speaker, a pivotal tone arm arranged on said head for carrying said stylus, and a spring for biasing said tone arm radially outward relative to said grooves.

51. The toy of claim 42 including a rotatable head supporting said speaker, a pivotal tone arm arranged on said head for carrying said stylus, and a spring for biasing said tone arm radially outward relative to said grooves.

52. The toy of claim 51 including: a stylus rocker arm pivotally mounted on said tone arm and carrying a stylus so movement of said stylus in response to mechanical modulations in said grooves rocks said stylus rocker arm about a pivot axis; a speaker rocker arm generally transverse to said stylus rocker arm and pivotally supported on said head for rocking motion about a pivot axis; means for coupling the central region of said speaker to a region of said speaker rocker arm off said pivot axis of said speaker rocker arm; and surfaces of said stylus rocker arm on opposite sides of said pivot axis of said stylus rocker arm engaging surfaces of said speaker rocker arm on opposite sides of said pivot axis of said speaker rocker arm so said motion of said stylus rocker arm is transmitted to said speaker rocker arm and through said coupling means to said speaker.

53. The toy of claim 52 including ridges formed along the edges of said speaker rocker arm on opposite sides of said pivot axis of said speaker rocker arm, one of said surfaces of said stylus rocker arm on one side of said pivot axis of said stylus rocker arm engaging one of said ridges, and another surface of said stylus rocker arm on the opposite side of said pivot axis of said stylus rocker arm engaging the other of said ridges.

54. The toy of claim 52 wherein said stylus in mounted forward of said speaker rocker arm pivot axis in the direction of motion of said stylus relative to said grooves.

55. The toy of claim 54 wherein said stylus in mounted radially outward from the pivot axis of said stylus rocker arm.

56. The toy of claim 51 wherein said selector mechanism includes a manually movable pointer mounted in the region of said visible displays and coupled to said cam for positioning said cam.

57. The toy of claim 56 wherein said grooves are arranged in radially separated spirals, and said cam is movable radially relative to said grooves, and wherein said cam includes a surface for holding said stylus away from said record element as said stylus moves and for guiding said stylus to a release region radially movable relative to said grooves.

58. The toy of claim 56 wherein said grooves are arranged in angularly separated spirals, and said cam is movable angularly relative to said grooves; and wherein said cam includes a surface for holding said stylus away from said record element as said stylus moves and for guiding said stylus to a release region angularly movable relative to said grooves.

59. The toy of claim 40 wherein said central opening and said engaging portion of said hub having corresponding conical shapes.

60. The toy of claim 42 wherein said speaker is arranged concentrically with said spiral grooves.

61. The toy of claim 52 wherein said speaker is arranged concentrically with said spiral grooves.

* * * * *